(12) United States Patent
Vippagunta

(10) Patent No.: US 10,270,730 B1
(45) Date of Patent: Apr. 23, 2019

(54) DETERMINING A DYNAMIC DATA FEED

(71) Applicant: Amazon Technologies, Inc., Seattle, WA (US)

(72) Inventor: Rajendra Kumar Vippagunta, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 395 days.

(21) Appl. No.: 14/739,839

(22) Filed: Jun. 15, 2015

(51) Int. Cl.
*H04L 12/58* (2006.01)
*G06F 17/30* (2006.01)

(52) U.S. Cl.
CPC ........ *H04L 51/32* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 7,433,832 B1* | 10/2008 | Bezos | ..................... | G06Q 10/10 705/26.8 |
| 2002/0087426 A1* | 7/2002 | Shiitani | ................... | G06Q 30/02 705/26.61 |
| 2009/0030788 A1* | 1/2009 | Boudah | .................. | G06Q 30/02 705/14.71 |
| 2010/0125803 A1* | 5/2010 | Johnson | ............ | G06F 17/30873 715/760 |
| 2011/0119148 A1* | 5/2011 | Yoshii | ..................... | G06Q 30/02 705/26.7 |
| 2012/0290446 A1* | 11/2012 | England | ............. | G06Q 30/0282 705/27.1 |
| 2013/0013749 A1* | 1/2013 | Kane, Jr. | .............. | G06F 17/3089 709/219 |
| 2013/0179428 A1* | 7/2013 | Archambault | .... | G06F 17/30864 707/711 |
| 2013/0218687 A1* | 8/2013 | Sohangir | ........... | G06F 17/30867 705/14.66 |
| 2013/0226937 A1* | 8/2013 | Moritz | ................ | G06F 17/3087 707/748 |
| 2013/0311324 A1* | 11/2013 | Stoll | ................... | G06Q 30/0214 705/26.7 |
| 2014/0089306 A1* | 3/2014 | Rana | .................. | G06F 17/30554 707/731 |
| 2014/0222911 A1* | 8/2014 | Haugen | ................... | H04L 67/22 709/204 |

(Continued)

*Primary Examiner* — Joshua Joo
(74) *Attorney, Agent, or Firm* — Kilpatrick Townsend & Stockton LLP

(57) ABSTRACT

Techniques for determining a dynamic data feed may be provided. For example, a system may receive interaction data associated with one or more connection identifiers (e.g., interactions between one or more user accounts and one or more items, including one user interacting with a social network profile of another user, providing a review for an item after purchase, providing a rating associated with the item, adding an item to a wish list, a user sending a communication to another user, etc.). One or more cards may be generated based at least in part on the interaction data, and include information about the one or more users associated with the one or more connection identifiers and the item. The cards may be sorted, aggregated, or filtered and/or provided for presentation.

20 Claims, 11 Drawing Sheets

(56) References Cited

U.S. PATENT DOCUMENTS

2014/0280590 A1* 9/2014 Nemer ............... G06Q 30/0214
                                                    709/204
2014/0337160 A1* 11/2014 Jin ..................... G06Q 50/01
                                                    705/26.7
2017/0083943 A1* 3/2017 Bosworth .......... G06Q 30/0255

* cited by examiner

DETERMINING A DYNAMIC DATA FEED

BACKGROUND

Social networks excel at connecting users when its users have identified friends and acquaintances for the social network. However, social networks often fail to analyze the connections to provide additional services outside of the social network environment.

BRIEF DESCRIPTION OF THE DRAWINGS

Various embodiments in accordance with the present disclosure will be described with reference to the drawings, in which.

DETAILED DESCRIPTION

Figure 1:
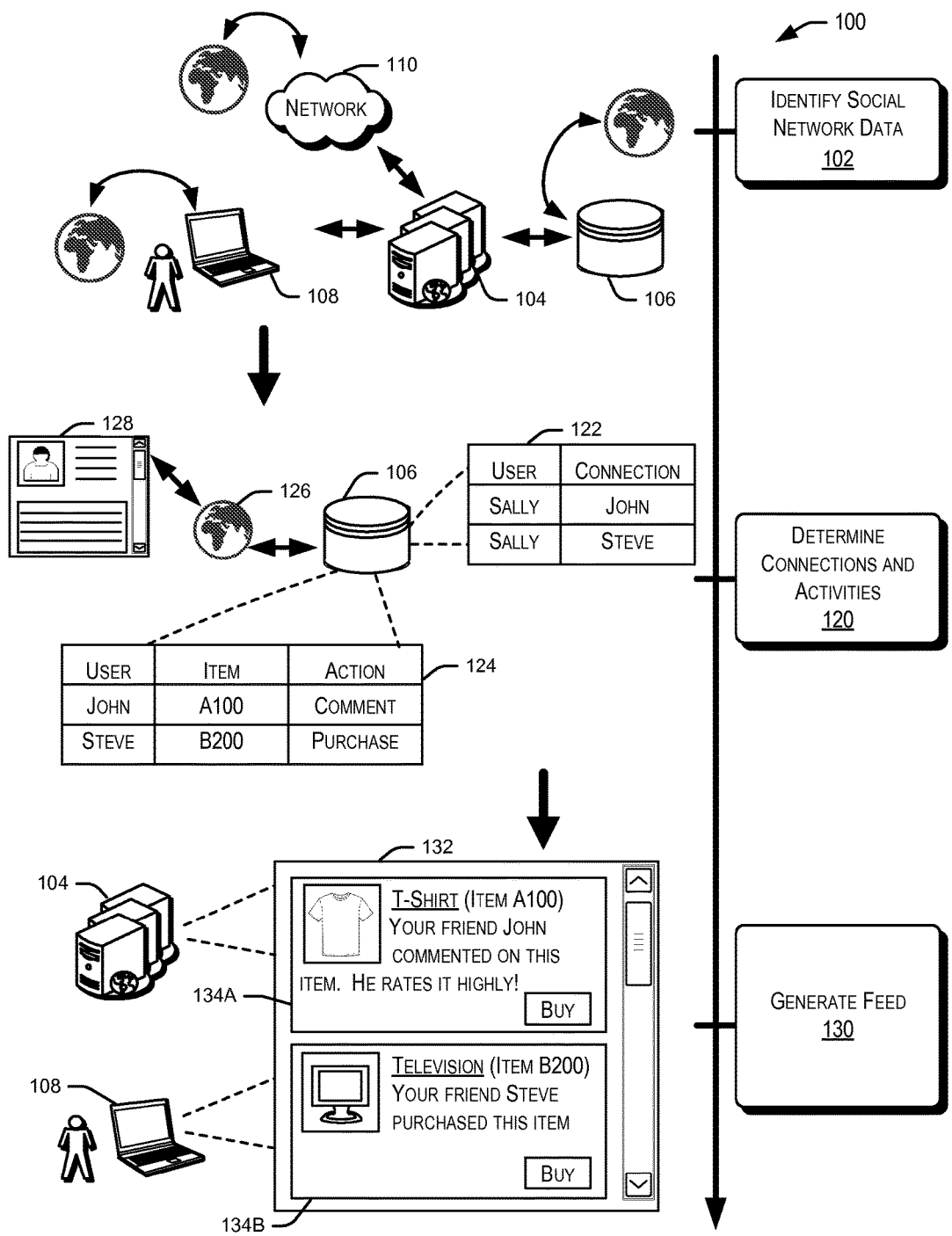
FIG. 1 illustrates an illustrative flow for determining a dynamic data feed described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for determining a dynamic data feed (e.g., a selection of items that are provided for display in a user interface that can by dynamically updated, one or more data streams provided for display in a graphical user interface, a list of graphical items displayed on a network page, etc.). The system may receive interaction data associated with one or more connection identifiers (e.g., identifiers of connections between users including connections based at least in part on interactions between one or more users and/or one or more items, such as one user interacting with a social network profile of another user, providing a review for an item after purchase, providing a rating associated with the item, adding an item to a wish list, a user sending a communication to another user, etc.). The item may be offered for purchase and the users may be linked or related in a social network (e.g., one or more connections between users that can be represented as a graph of social relationships, the social relationships (e.g., friend, follower) being specified by the users and/or the system maintaining the social network, etc.). One or more cards (e.g., graphical representations of the item, interactions, users, etc. that are displayed on a network page accessed by a computing device, etc.) may be generated based at least in part on the interaction data, and include information about the one or more users associated with the one or more connection identifiers and the item. The cards may be sorted, aggregated, or filtered (e.g., based at least in part on an order history of the user, etc.) and/or provided for presentation.

In an illustrative example, a user registers with a system and permits the system to access social network data from other computer systems (e.g., one or more computers, networked computers, etc.). The system then gathers data to identify friends and connections associated with the user. The system also determines items associated with the user's friends that are reviewed (e.g., a user may review an item after a purchase via an electronic marketplace associated with the system, etc.), rated (e.g., a user may provide a rating for an item by providing feedback provided about an item after purchase in the form of comments, rankings, providing stars/scores, etc.), or added to a wish list (e.g., an item identified by the user as a future purchase from a merchant, etc.). These interactions between the friends and the social networks may be organized, sorted, or aggregated into graphical, interactive cards for display in a data feed presented by the system (e.g., that also provides and electronic marketplace of merchants to purchase the items displayed in the cards, etc.). The user may activate the cards to access information and/or purchase the items. In some examples, the user's order history through the electronic marketplace may be analyzed to affect the sorting and/or aggregation algorithm of the cards, causing items that are more relevant to the user to be highlighted or sorted in the feed based at least in part on the user's affinity for the item.

In another illustrative example, the cards may be provided or sorted based at least in part on a category. For example, a card may include item "television A100" because a friend of a user provided feedback about the television after a purchase. The category for this card may include "electronics." The user may also be associated with the category "electronics" because the user ordered a mobile device a month earlier, which is associated with the same category. A second friend may add the same television to a wish list, which may also be associated with a card. Both cards may be presented with the user's feed.

FIG. 1 illustrates an illustrative flow for determining a dynamic data feed described herein, according to at least one example. The process 100 can begin with identifying social network data at 102. For example, a computer system 104 can interact with a data store 106, a user device 108, or network 110 to access social network data and/or interaction data associated with the one or more social networks (e.g., a user's interactions with other users, interactions between one or more user accounts, data associated with a communication transmitted between one or more users, an interaction between a user, item, review, rating, wish list, etc.). For example, the social network may provide a platform for one or more users and/or user accounts (used interchangeably) to interact with each other, which can be provided by a second computer system. The social network data and/or interaction data may be stored with data store 106 or dynamically received from the second computer system. Other types of data may be shared or stored with the data store 106 without diverting from the scope of the disclosure.

The process 100 may also determine connections and activities at 120. For example, the social network data and/or interaction data can be accessed by computer system 104. The data store 106 may include connections 122 (e.g., a contact formed based at least in part on user activity, implicit interaction between users, and/or explicitly indicated social relationships, including Sally to John, Sally to Steve, etc.). The data connections 122 may be identified by connection identifiers (e.g., identifier A12345, B234560, etc., identifiers as keys in a data store, etc.). The individual user connections can be associated with one or more connection identifiers.

The data store 106 may also include item data 124 associated with one or more users and/or connections. For example, user John may provide a comment (e.g., provide feedback or other content) for item A100 via a social network, electronic marketplace, or other computer system. In another example, user Steve may purchase (e.g., add an item to an electronic shopping cart, provide payment information to acquire the item from a merchant, etc.) item B200 via a social network, electronic marketplace, or other computer system. The item data may be associated with the user (e.g., Sally) based at least in part on the user's connections to other user accounts (e.g., John and Steve).

The data store 106 (e.g., and/or the computer system 104) may also interact with one or more social networks 126 to receive social network data 128. The social network data 128 may include a review associated with an item, a rating associated with the item, or a portion of a wish list that includes the item. The item may be offered by computer system 104 for purchase (e.g., outside of the context of the one or more social networks 126 provided by different computer systems, etc.).

In some examples, the computer system 104 may provide an electronic marketplace and a second computer system may provide the social network. The computer system 104 may not provide a social network locally, and sometimes request to receive the social network data 128 from the second computer system. In some instances, the computer system 104 may be associated with an electronic marketplace and a second social network, but not the one or more social networks 126 (e.g., the social network and second social network may be different), causing the computer system 104 to request additional social network data associated with the second social network from the second computer system (e.g., remote from the computer system 104, etc.). In some examples, the computer system 104 may receive permission (e.g., from a user, from a network administrator or permissions data store, etc.) to contact the second social network. In some examples, the computer system 104 may provide the electronic marketplace and the social network (e.g., without receiving the social network data 128 from a second computer system, etc.).

The data store 106 may also include an order history of the user. For example, the computer system 104 may identify one or more purchase between the user and one or more merchants. The order history can include item data (e.g., item identifier, description, image of the item, price, merchant providing the item, link to the purchase the item from the merchant, etc.) and/or at least one category. The item category can group the item with other similar items (e.g., a television may be included with category "electronics," a t-shirt may be included with category "clothing," etc.).

The process 100 may also generate a feed at 130. The feed may be provided for presentation on a network page 132 and include one or more cards 134 (illustrated as card 134A and card 134B). In some examples, the cards 134 may include item data associated with the order history (e.g., item identifier, description, image of the item, price, merchant providing the item, link to the purchase the item from the merchant, etc.).

The cards 134 may be ranked, sorted, and/or aggregated. For example, the cards 134 may be associated with one or more weights by computer system 104 and/or adjusted with additional information about the card. For example, the weights may correspond to magnitudes that are incorporated into a ranking, sorting, and/or aggregation algorithm (e.g., weights utilized by a linear and/or nonlinear scoring function). As a sample illustration, each card may start with a weight of one when a friend (e.g., a second user connected with the user that receives the feed, etc.) rates, reviews, or adds an item associated with the card to a wish list.

The weight may be increased for various reasons. For example, the weight can be increased (e.g., 1.0 to 2.0) when a category identified in an order history of the user (e.g., Sally) matches a category identified for the card (e.g., electronics). The weight can be increased when a connection between the user and the friend is a particular connection type (e.g., family members, frequent interactions between user and friend, etc.). The weight may also be increased when the activity performed by the friend is a particular activity and/or the user is associated with an affinity for that activity (e.g., the user frequently reads feedback about electronics items, so the weight is increased when the friend provides feedback about an electronic item, etc.). The weight may be decreased as well, including decreasing the weight based at least in part on a time or decay rate (e.g., to sort older cards lower than newer cards, etc.).

The computer system 104 may provide the cards 134 via the network page 132 for the user 108. For example, the presentation can include a data feed that comprises a plurality of data cards (e.g., one card for item 1, one card for item 2, etc.). The presentation can include different types of cards (e.g., a recommendation for the item, a review of an item, etc.). The cards 134 may be stored with data store 106 based at least in part on the weight and presented in a sorted affinity order (e.g., the user frequently reads feedback about electronics items, so the affinity for cards associated with the electronics category are higher than cards associated with the clothing category, etc.).

The computer system 104 may receive an activation of the card after the card is provided for presentation. The card may be activated when the user device 108 selects, taps, and/or clicks, etc. on an area associated with the card. The activation may correspond with a request to purchase the item associated with the card. In some examples, activation of the card may initiate an action in response to the activation. For example, when the activation corresponds with a request to purchase the item, the request to purchase the item may be submitted through an electronic marketplace of items associated with the computer system 104.

In some examples, the activation of the card may generate additional interaction data. The interactions may be used to generate additional cards. For example, the network page 132 may present the cards 134, receive an interaction with one or more of the cards presented at the network page 132, identify the interaction as additional interaction data (e.g., as illustrated with block 102), and proceed through the process illustrated in FIG. 1 to provide additional cards on the feed by the network page 132.

Figure 2:
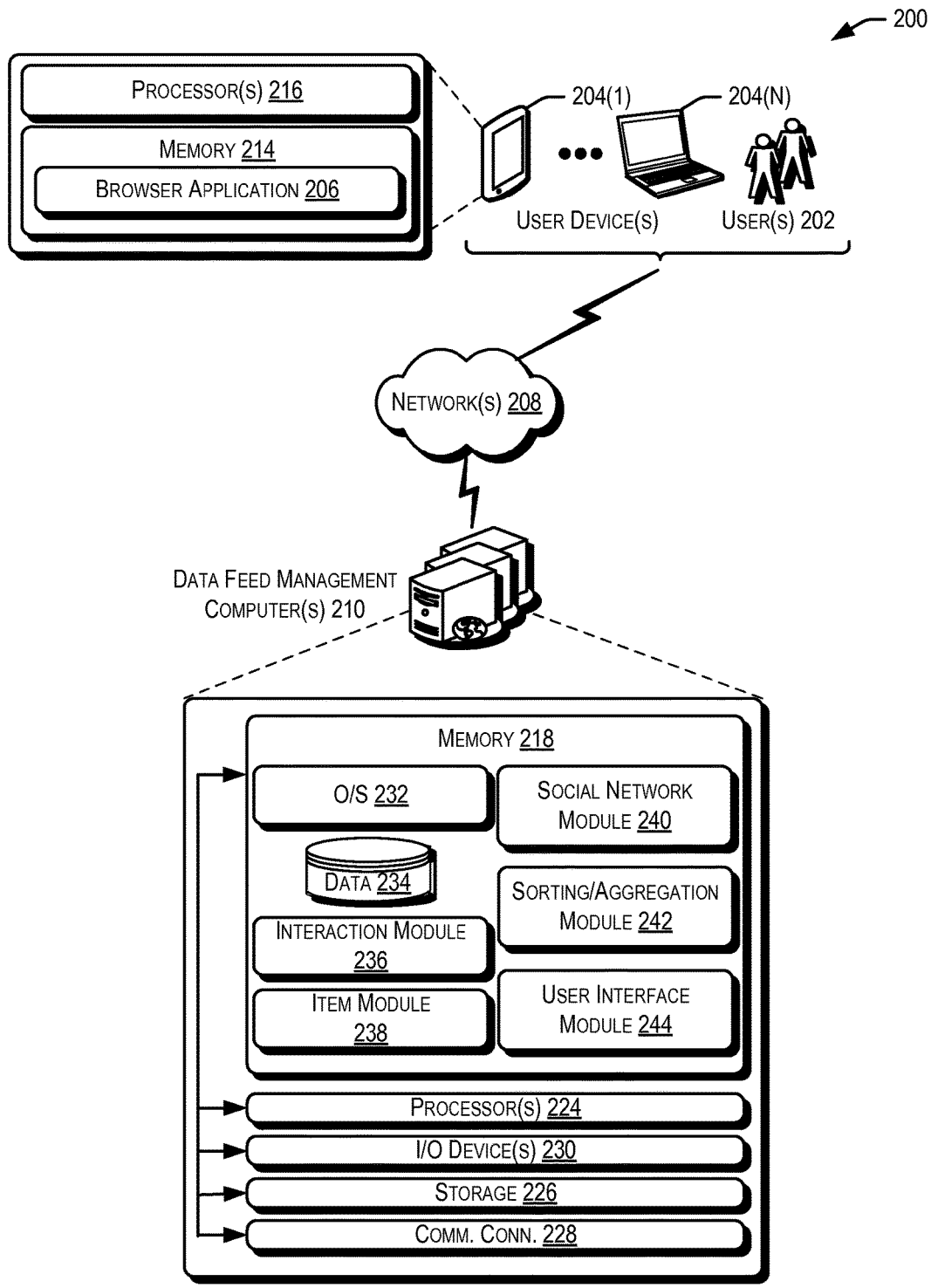
FIG. 2 illustrates an example architecture for determining a dynamic data feed described herein that includes a data feed management computer and/or a user device connected via one or more networks, according to at least one example.

FIG. 2 illustrates an example architecture for determining a dynamic data feed described herein that includes a data feed management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more data feed management computers 210. The one or more data feed management computers 210 may, in some examples, provide computing resources such as, but not limited to, client entities, low latency data storage, durable data storage, data access, management, virtualization, cloud-based software solutions, electronic content performance management, etc. The one or more data feed management computers 210 may also be operable to provide web hosting, computer application development, and/or implementation platforms, combinations of the foregoing, or the like to the one or more users 202. The one or more data feed management computers 210, in some examples, may help determine a dynamic data feed associated with one or more social networks, and present the dynamic data feed to one or more user devices 204.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the data feed management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more data feed management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the data feed management computers 210 via the networks 208, or via other network connections. Additionally, the user devices 204 may be part of the distributed system managed by, controlled by, or otherwise part of the data feed management computers 210 (e.g., a console device integrated with the data feed management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the data feed management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the data feed management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the data feed management computers 210 may be in communication with the user devices 204 and/or other service providers via the networks 208, or via other network connections. The data feed management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the data feed management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of data feed management computers 210, the memory 218 may be volatile (such as RAM) and/or non-volatile (such as ROM, flash memory, etc.). The data feed management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the data feed management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the data feed management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The data feed management computers 210 may also contain communications connection(s) 228 that allow the data feed management computers 210 to communicate with a stored database, another computing device or server, user terminals and/or other devices on the networks 208. The data feed management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an interaction module 236, item module 238, social network module 240, sorting/aggregation module 242, and/or user interface module 244. The modules may be software modules, hardware modules, or a combination thereof. If the modules are software modules, the modules will be embodied on a computer readable medium and processed by a processor in any of computer systems described herein.

The interaction module 236 may be configured to determine interactions. For example, the data feed management computers 210 may determine one or more interactions between a user and other users, a user account and other user accounts, one or more connection identifiers associated with a user, one or more interactions between a user and an item, actions performed by the user, or other interactions discussed herein. In some examples, the association of one or more connection identifiers, the user, and the item may be identified from the interaction data. The interactions may be identified in the interaction data (e.g., associated with a connection between two users, etc.), dynamically identified from a list of users, and/or identified when a user is associated with another user by a connection identifier.

The item module 238 may be configured to receive information about an item (e.g., item data) and/or interactions with the item. For example, the data feed management computers 210 may identify item data from a merchant, a merchant network page that describes the item, a data store of item information, or other sources. Interactions with the item may be identified in social network data and/or interactions with items in an electronic marketplace (e.g., review, rating, add to a wish list, etc.).

The social network module 240 may be configured to receive data from a social network. The social network may include one or more users connected with a user (e.g., directly connected based at least in part on a request from the user(s) to connect, connected through indirect connections, etc.). For example, the data feed management computers 210 may receive the social network data from a computer that operates the social network and, in some examples, the social network may be managed by different computer system than the data feed management computers 210 (e.g., which operates the feed, electronic marketplace, sorting/aggregating algorithm, etc.). For example, the social network module 240 may access the second computer system (e.g., that operates the social network, after receiving permission to contact the social network, etc.) and/or receive the data directly from the second computer system (e.g., via an application programming interface (API), etc.).

The sorting/aggregation module 242 may be configured to sort or aggregate cards for a feed. For example, the data feed management computers 210 may provide the one or more cards to a feed presented to a user via a network page. The data feed management computers 210 may sort the cards (e.g., by category, connection identifier, time, friend/connection, etc.). In some examples, the cards may be aggregated so that one card is presented instead of two or more when the cards share some data (e.g., shared category, connection identifier, time, friend/connection, etc.).

The user interface module 244 may be configured to provide a user interface. For example, the data feed management computers 210 can generate cards and/or a feed to display at a network page that is accessed by a user device 204. The data feed management computers 210 can update the cards or feed when the data feed management computers 210 receive updates comprising interaction data (e.g., second interaction data associated with the user, one or more cards associated with the user and/or friends, etc.). In some examples, the second interaction data can include a request to purchase the item or some other action received in response to presenting the card. As a sample illustration, the data feed management computers 210 may generate one or more cards based at least in part on first interaction data (e.g., including information about the one or more users associated with an item, etc.) and update markup language (e.g., HTML, XML, etc.) to display the cards on a network page. The updated interaction data can be received after the user interface identifies an action associated with at least one of the presented cards.

Figure 3:
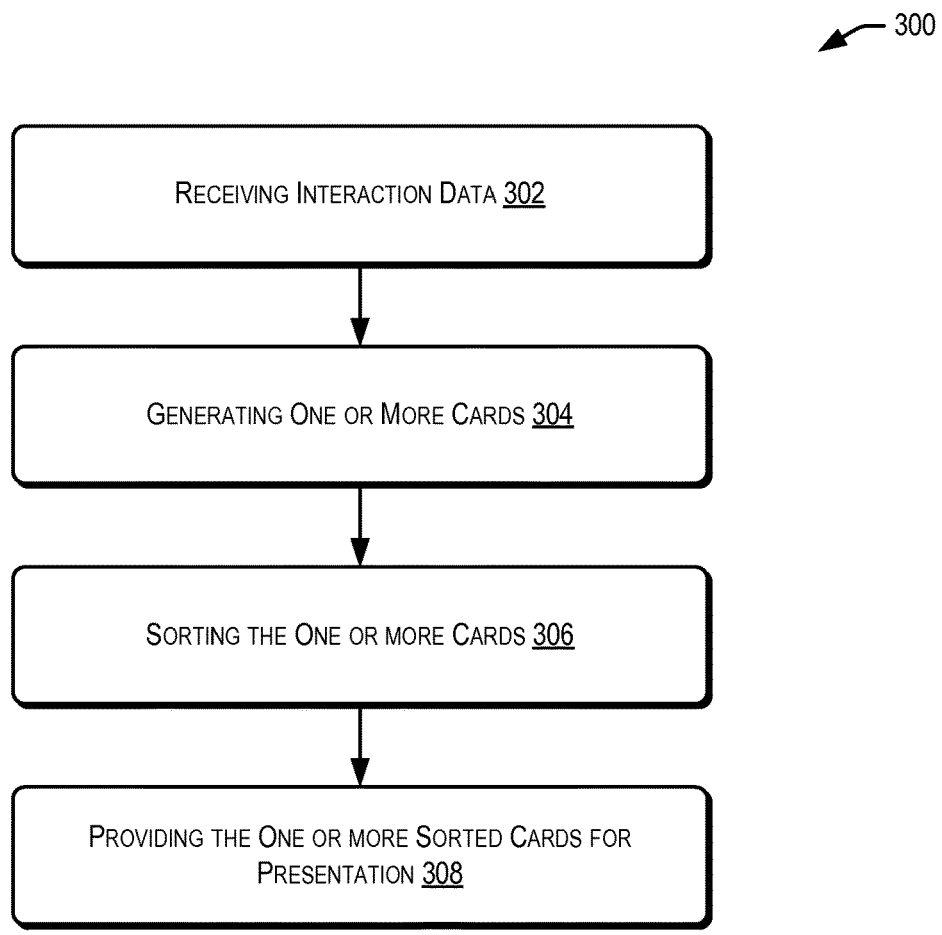
FIG. 3 illustrates an example flow determining a dynamic data feed described herein, according to at least one example.

FIG. 3 illustrates an example flow determining a dynamic data feed described herein, according to at least one example. In some examples, the one or more data feed management computers 210 (e.g., utilizing at least one of the interaction module 236, item module 238, social network module 240, sorting/aggregation module 242, and/or user interface module 244) or one or more user devices 204 shown in FIG. 2 may perform the process 300 of FIG. 3.

Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 300 may begin at 302 by receiving interaction data. For example, the data feed management computers 210 may determine, receive, analyze, reference, or otherwise access the interaction data. The interactions may correspond to interactions between the one or more users or items. In some examples, the interactions may include a review associated with an item, a rating associated with the item, or a portion of a wish list that includes the item.

In some examples, the data feed management computers 210 (e.g., a first computer system) may also receive an identification of a social network provided by a second computer system. The social network can include one or more users connected with a user and individual user connections may be associated with a connection identifier.

At 304, one or more cards may be generated. For example, the data feed management computers 210 may generate the one or more cards based at least in part on the interaction data associated with one or more connection identifiers (e.g., as explained with FIG. 8). The cards may include information about the users associated with the one or more connection identifiers and the item. In some examples, the cards may include graphical user interface components and/or correspond with purchasable items offered in part by the data feed management computers 210.

At 306, the one or more cards may be sorted. For example, the data feed management computers 210 may sort the one or more cards based at least in part on an order history of the user. In some examples, the cards may be stored based at least in part on other factors discussed throughout the disclosure.

At 308, the one or more cards may be provided for presentation. For example, the data feed management computers 210 may provide a graphical user interface via a network page for one or more user devices to access through a network. The graphical user interface can display graphical representations of the cards.

Figure 4:
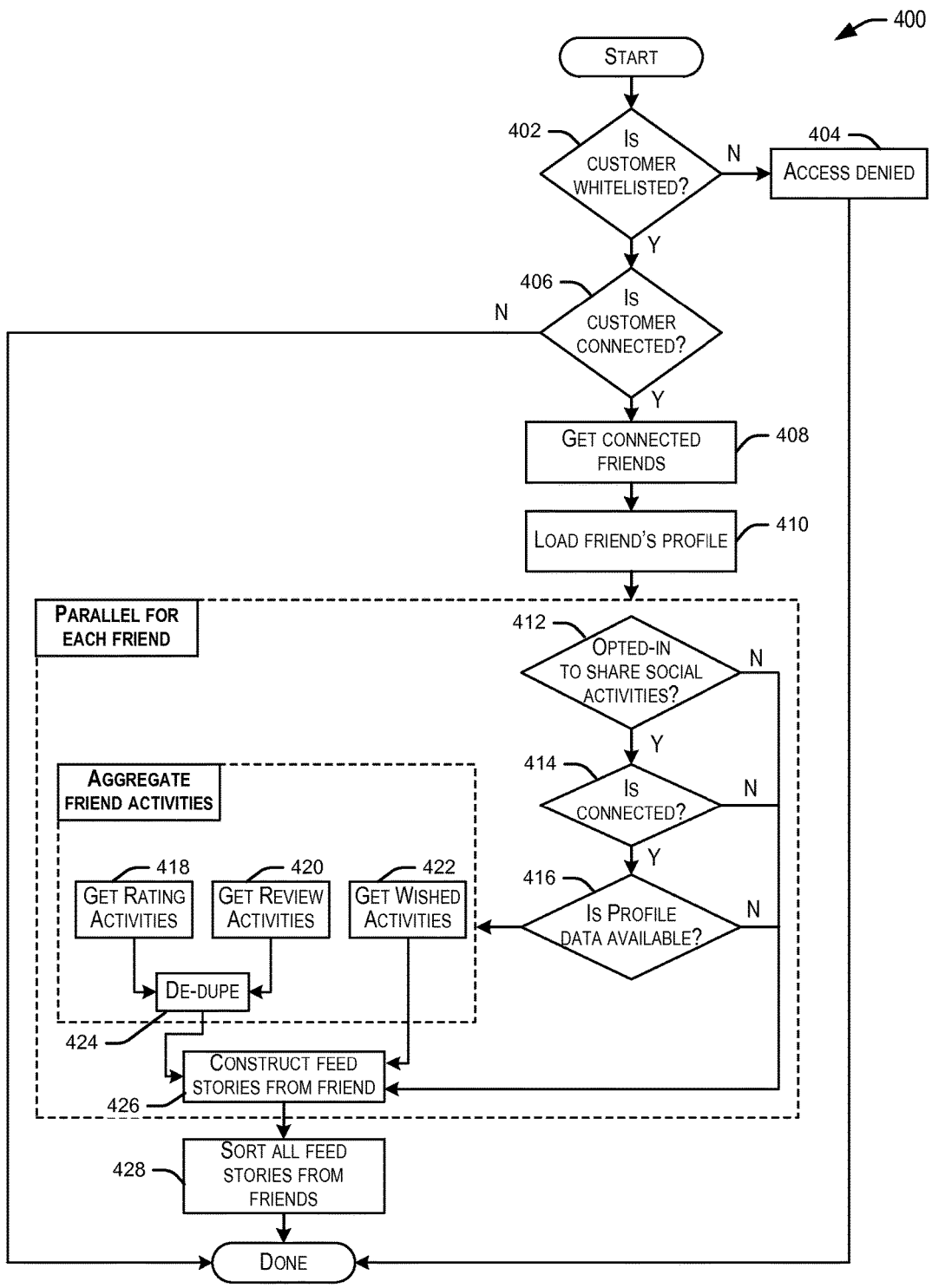
FIG. 4 illustrates an example flow determining a dynamic data feed described herein, according to at least one example.

FIG. 4 illustrates an example flow determining a dynamic data feed described herein, according to at least one example. In some examples, the one or more data feed management computers 210 (e.g., utilizing at least one of the interaction module 236, item module 238, social network module 240, sorting/aggregation module 242, and/or user interface module 244) or one or more user devices 204 shown in FIG. 2 may perform the process 400 of FIG. 4.

Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 400 may begin at 402 by determining whether a user is whitelisted. The whitelist may include a set of user identifiers or profiles of users that are permitted access. For example, the one or more data feed management computers 210 and identify a list of approved user names and determine whether a user identifier (e.g., user name, profile, alphanumeric code, etc.) associated with the user is on the list. The list may comprise a group of identifiers that are accepted or pre-authorized (e.g., determined through an automated process, determined by an administrator, etc.). In some examples, the determination of the whitelist may be dynamic and not involve a list or stored information in a data store.

The list may be generated based at least in part on whether the user has provided permission to access the social network. In some examples, the user may be whitelisted at a device-level, so an identifier associated with the user device (e.g., internet protocol (IP) address, media access control (MAC) address, etc.) may be listed, instead of or in addition to the user identifier or profile.

At 404, access may be denied. For example, when the user is not whitelisted, the access may be denied. In some examples, when the determination of the whitelist is dynamic, the denial of access may also be dynamic and/or not interact with a permanent storage (e.g., a cache, etc.).

At 406, the process 400 may determine whether the user is connected. For example, the connection may refer to whether the user is associated with one or more social networks. The user may register with the social network, receive a user identifier, and provide the user identifier to a computing device associated with process 400. The connection may be based at least in part on the existence of a user identifier for the social network and/or whether any data for the user exists with the social network.

In some examples, the connection may be based at least in part on a wired or wireless connection to the computing device, and/or a connection within a particular time period. For example, when the user connects with the computing device to create a user profile, the user may be connected and the process 400 may proceed to 408. When the user is not connected, the process 400 may finish.

At 408, the process 400 may receive an identification of one or more users and/or friends (used interchangeably). The one or more users may be associated with the connected user. User data may be received as well, including one or more user identifiers, user location, time accessed the social network, demographic information, connection identifiers associated with other users or items, interaction data associated with the social network, and the like.

At 410, the process 400 may store the additional information from the one or more users via the social network with the data store. The user data for the friends may be stored with the user data for the user associated with a user device and/or electronic marketplace.

At 412, the process 400 may determine whether the user shared data. For example, the user may opt-in to share the data and/or interact with a tool to actively or passively share the data. The data may include interaction data or other activities associated with the social network. In some examples, the process may be limited to the users that are associated with a connection identifier to the original user identified with block 406 (e.g., "friends" of the user).

At 414, the process 400 may determine whether the user (e.g., friend) is connected with a second computing device. For example, the user may operate a first computing device to access the social network and a second computing device may provide an electronic marketplace of items (e.g., through a second social network). In some examples, the computing device can determine whether the user is connected to the first and second computing device at 414.

At 416, the process 400 may determine whether profile data is available. For example, the user (e.g., friend) may opt-in and/or register to share the user data through the social network. When the one or more data feed management computers 210 accesses the social network and/or the second computer that manages the social network to request data, the second computer may provide the data when it is available. The second computer may also provide data when the user has opted in and/or provided permission to access the data, the user has registered with the one or more data feed management computers 210, and the like.

At 418, 420, and 422, the process 400 may receive particular data for one or more users (e.g., friends), including ratings, reviews, and wish list items, respectively. The rating data may include feedback provided by the user about an item after purchase in the form of comments, rankings, providing stars/scores, etc. The review data may include feedback from the user after a purchase of the item via a merchant and/or an electronic marketplace that associates a plurality of merchants, etc. The wish list may include one or more items identified by the user as a future purchases from one or more merchants.

The rating data, review data, and wish list data may be used to generate one or more cards. The cards may include a graphical or textual representation of the rating data, review data, and wish list data. In some examples, the cards may include item data that is associated with an order history of the user. For example, the information may include an item identifier, description, image of the item, price, merchant providing the item, link to the purchase the item from the merchant, etc.

At 424, the process 400 may de-duplicate and/or filter the data or cards. For example, a user may provide a comment about an item (e.g., in an initial review of a purchase) and provide a response to a question about the same item. The multiple comments may be de-duplicate and/or filtered so that only one card is presented (e.g., for the initial review of the purchase).

At 426, the process 400 may construct a feed. For example, the one or more data feed management computers 210 may identify the one or more cards and combine the cards into a data feed (e.g., a first card listed at the top of the feed, the next card listed below the first card, etc.). The feed may contain cards associated with one or more users, friends, items, connection identifiers, or other data.

In some examples, one or more blocks may be repeated. For example, 412, 414, 416, 418, 420, 422, 424, and 426 may be repeated for one or more users that are associated with connection identifiers with the user and/or item. In another example, 418, 420, 422, and 424 may be repeated to aggregate one or more cards and/or interaction data.

At 428, the process 400 may sort the cards. For example, the one or more data feed management computers 210 may place the cards in a descending time order and present the cards/feed in that order for the user. In some examples, the cards may be weighted, as discussed throughout the disclosure including with FIG. 1. The cards may be sorted using other methods as well, as discussed herein.

The cards may be aggregated or filtered. For example, the cards may be aggregated so that one card is presented instead of two or more when the cards share some data (e.g., shared category, connection identifier, time, friend/connection, etc.). When filtered, fewer than a plurality of cards may be presented for display with the feed (e.g., only one card is generated for a shared category, friend, and/or item, one card is generated for each unique item, etc.).

Figure 5:
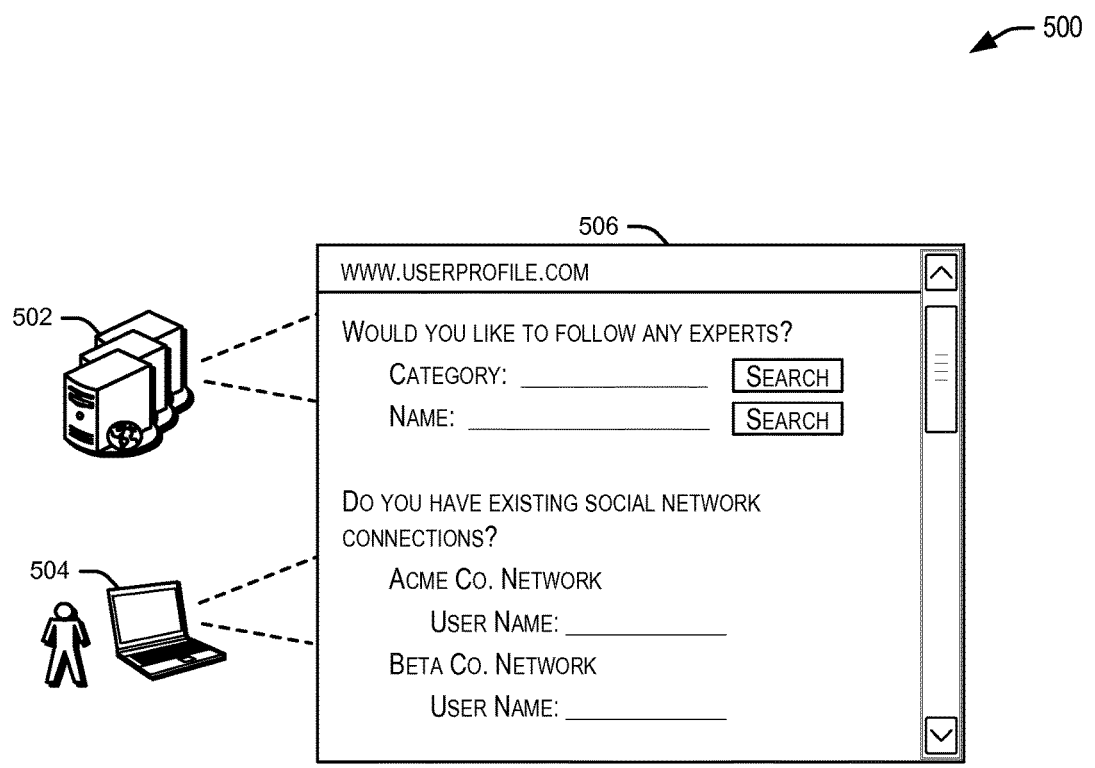
FIG. 5 illustrates an example of identifying users described herein, according to at least one example.

FIG. 5 illustrates an example of identifying users described herein, according to at least one example. In illustration 500, a computing device 502 interacts with a user device 504 via a network page 506. Examples of the computing device 502 are illustrated in FIG. 2 as the data feed management computers 210 and examples of a user device 504 is illustrated in FIG. 2 as the one or more user devices 204.

The computing device 502 may receive data from the user device 504 via the network page 506. The data may identify a user (e.g., associated with a user profile) and connections associated with the user. The connections may be associated with one or more social networks (e.g., that are or are not associated with computing device 502).

In some examples, the user device 504 may provide an identification of an expert user. The expert user may not be connected with a user (e.g., via a connection identifier), but the user may otherwise identify the expert user. The expert user may possess specialized knowledge and/or provide data (e.g., reviews, ratings, etc.) for the social network and/or electronic marketplace that the user would like included in their feed. In some examples, the expert user may include a celebrity (e.g., the user does not know the celebrity personally, but would like to receive information about the celebrity's interactions, etc.), a brand (e.g., the expert user is an entity or other non-person which may be associated with a category that provides reviews, ratings, comments, or other interactions to incorporate with the interaction data, cards, or data feed, etc.), or other entity that can be followed by a user. As illustrated, the user may identify the expert user by a user identifier, category (e.g., associated with items of interest to the user or expert user, associated with an order history of the user, etc.), or search for the expert user through a tool provided by the network page 506. In some examples, the identification of the expert user by the user may generate a connection identifier (e.g., A10000) to identify the relationship between the two users (e.g., as a one-way communication channel so that the user is identified of any actions performed of the expert user, but the expert user is not similarly informed of the actions of the user, etc.).

In some examples, the merchant and/or electronic marketplace is provided by a first computer system (e.g., the data feed management computers 210) and the social network is provided by a second computer system. Interaction data may be received from one or both computer systems, including actions of an expert user associated with either system.

In some examples, the first and second computer systems may each include a social network. For example, the first computer system (e.g., the data feed management computers 210) may provide a social network, an electronic marketplace comprising a plurality of merchants and items, and/or one or more merchants that provide items. The second computer system may also provide a social network (e.g., that is different from the social network provided by the first computer system, etc.). Either computer system may contain expert users.

Figure 6:
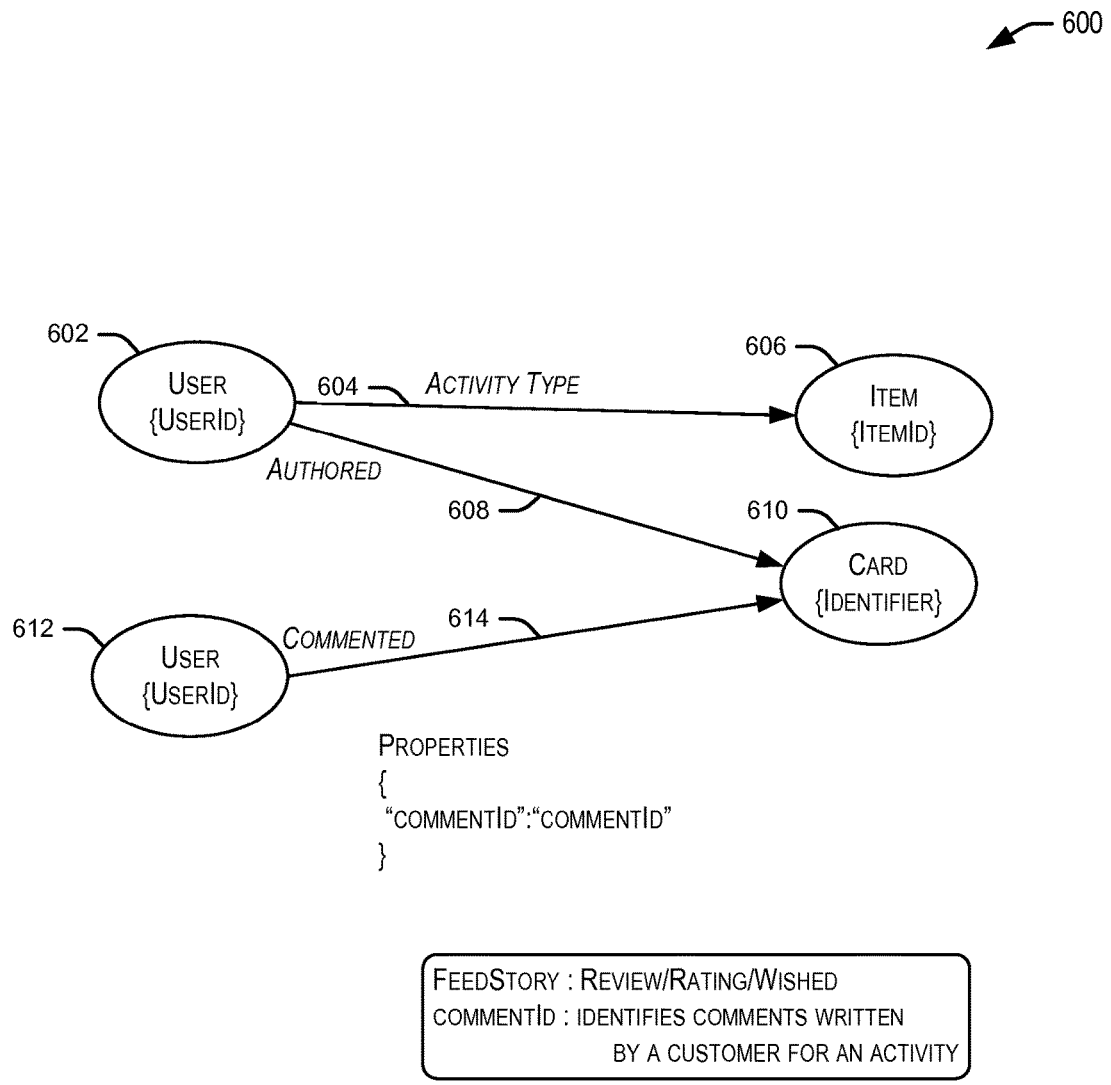
FIGS. 6-7 illustrate some examples of connection graphs described herein, according to at least one example.
Figure 7:
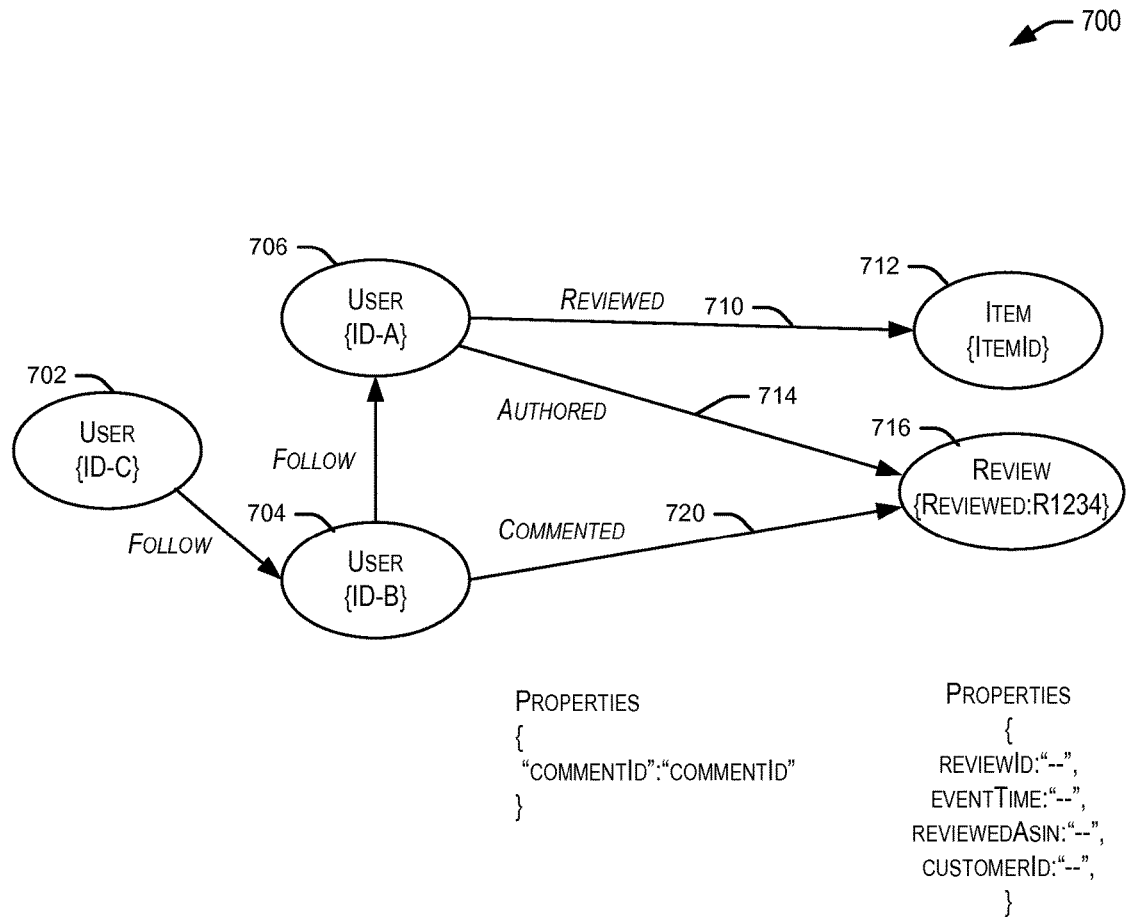

FIGS. 6-7 illustrate some examples of connection graphs described herein, according to at least one example. For example, one or more connection graphs can be generated by the data feed management computers 210 to identify a user, one or more users associated with the user, connection identifiers, actions, and other relevant information associated with a social network.

In illustration 600 in FIG. 6, a connection graph is provided. The connection graph includes user 602, connection 604, item 606, connection 608, card 610 (e.g., which may be added to a feed), user 612, and connection 614. The connection graph can include one or more users, activities or interactions, items, or cards, illustrated as nodes. The users, activities or interactions, items, or cards may be related, and identified as edges or connections between the nodes in the connection graph. The connection graph may be stored in different types of storage solutions (e.g., data store 234, etc.) in various formats (e.g., text-based, identifier-based, as an image of a connection graph, etc.).

Figure 8:
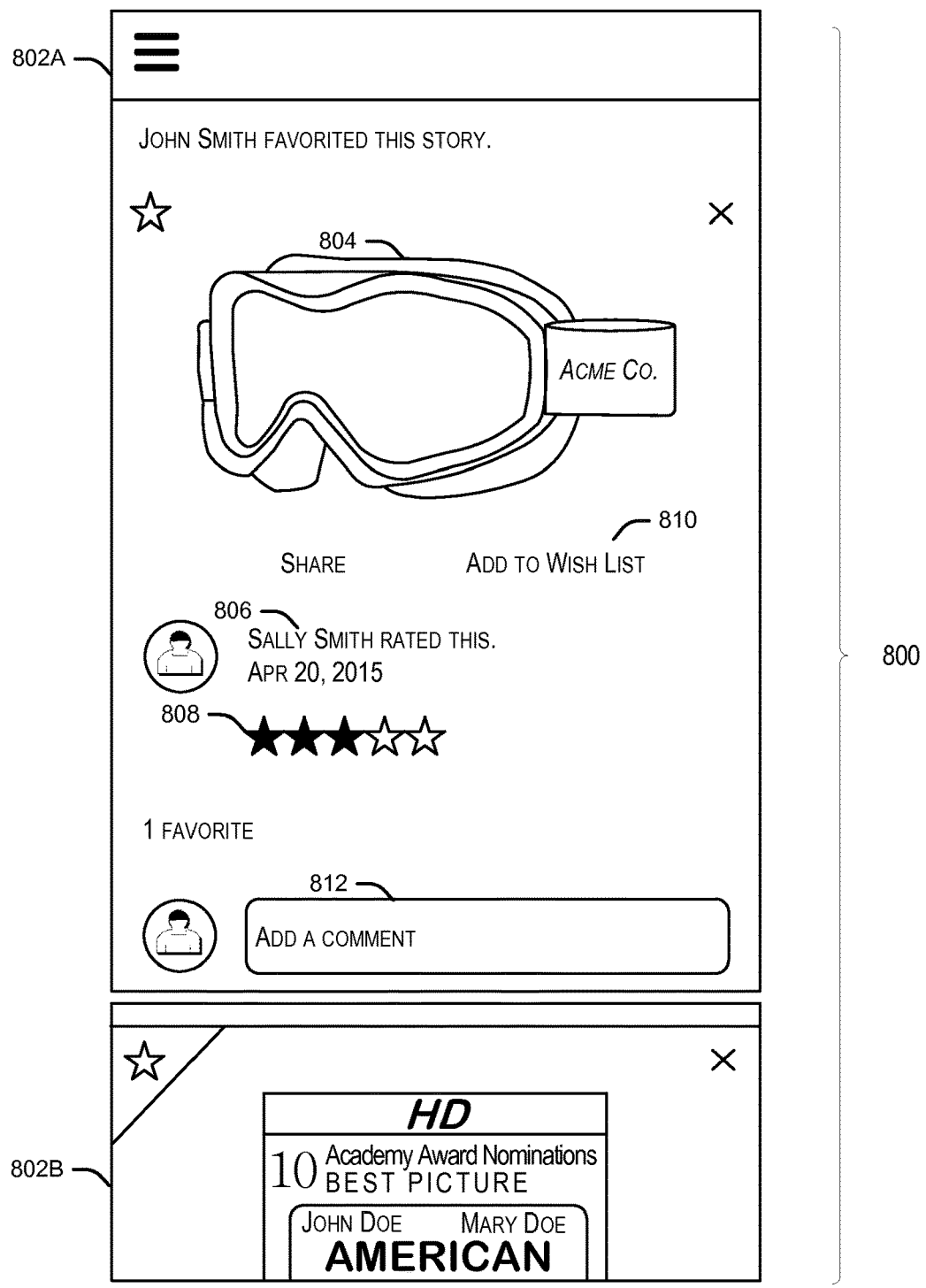
FIG. 8 illustrates an example of a data feed described herein, according to at least one example.

As illustrated, user 602 performs an activity with item 606, generating connection 604 between user 602 and item 606 (e.g., purchase item, review item, add the item to a wish list, etc.). User 602 may also interact with card 610 (e.g., provide a question about an item, respond to a question from another user, etc.), generating connection 608 between user 602 and card 610. In some examples, card 610 may be displayed in a feed (as illustrated in FIG. 8) and user 602 may interact with card 610 in the feed.

User 612 may also interact with card 610, generating connection 614. In some examples, connection 614 may correspond with the same card 610 as user 602. For example, user 602 and user 612 may be associated with the same user (e.g., friend) via a social network. When the friend generates interaction data, a card may be associated with each user and presented on one or more feeds.

The connection graph can be generated based at least in part on the interaction data. For example, the data feed management computers 210 can receive the interaction data and analyze the interaction data to determine one or more users, actions, and items in the interaction data. The data feed management computers 210 can associate (e.g., link) users to other users through actions. In some examples, the connection graph can link users to items through actions.

In some examples, the connection graph can be used in part to generate the feed (e.g., in an asynchronous process to present the cards, etc.). For example, a first user may be identified. Other users that are associated with the first user may be identified (e.g., based at least in part on a connection between the first user and other users, etc.). The activities associated with the other users may be identified as potential cards to add to the first user's feed. The potential cards may be sorted, aggregated, or filtered/removed from the feed. Once the cards associated with the other friends are identified, the feed for the first user may be generated to include one or more of the generated cards. In some examples, the process of generating the connection graph and cards, and providing the feed for the user may run at different times or asynchronously.

In illustration 700 in FIG. 7, three users are illustrated, including users 702, 704, and 706. User 702 may follow user 704 (e.g., connect with, become friends with, create an association by following as an expert user, etc.). User 704 may connect with user 706 as well.

User 706 may be associated with interaction data. As illustrated, user 706 may provide a review 710 for item 712, and also author 714 a review 716 (e.g., of the item). In some examples, the review 710 and author 714 may be associated with the same interaction (e.g., providing a review of the item). The graph may identify different aspects of the same interaction (e.g., the item 712 and the review 716).

Other users may be associated with the interaction as well. For example, user 704 may follow user 706 and/or identify the authored review (e.g., presented on the social network, identified through the user's feed, etc.). In another example, the user 704 may comment 720 on the review 716 (e.g., provide text or other interaction data to the social network and/or data feed to associate with the review 716 and/or present next to the review).

In a sample illustration, one user may interact with an item and another user may interact with the same item. The data feed management computers 210 can associate the connection between the users and/or items based at least in part on the interactions of the users. The identification can include a dynamic list, connection, or connections between the users that are identified before the interaction with the item occurs. The interactions or connections may be stored and analyzed in a data store.

FIG. 8 illustrates an example of a data feed described herein, according to at least one example. A data feed 800 may include one or more cards 802 (e.g., illustrated as card 802A and 802B). The cards may include one or more items 804, ratings 806, reviews 808, or other data. The user device may provide interaction data as well, including adding the item to a wish list 810, providing a comment or review 812, or other interactions discussed herein.

The data feed 800 may present the one or more cards 802 using various layouts. For example, the cards may be displayed vertically (as illustrated in FIG. 8) or horizontally. The user can access the cards by scrolling, swiping, or otherwise interacting with the user interface that displays the data feed 800. For example, the data feed 800 may display a first card. When the user scrolls down, the data feed may present a second card, as if browsing through a network page. Partial cards may be displayed while scrolling. In some examples, the data feed may present an entire first card on the user interface and, when the user scrolls down, present an entire second card on the user interface (e.g., without mimicking the function of scrolling between cards or showing a portion of the card, etc.). In some examples, one card may be presented on a user device at a time (e.g., showing no partial cards, etc.) and other cards may be accessed by scrolling or swiping.

In some examples, the cards may be presented chronologically. For example, when presented vertically, the data feed 800 may provide the most recent card first, the second most recent card second, and so on. When presented horizontally, the user may swipe the card left to access a more recent card and swipe the card right to access an older card. Other implementations of layouts and presenting cards in relation to time may be implemented without diverting from the scope of the application.

One or more cards 802 may be generated using various methods. For example, user John may be connected with user Sally in a social network. When user Sally provides comments about an item via the social network (e.g., writes a review of a recent purchase, provides a star rating of an item the user is considering for purchase, etc.), a card may be generated. The card may include the review, source of the information (e.g., user Sally, etc.), and any other relevant information. The card may be added to user John's feed.

In another example, user John may be connected with user Sally and user Jane in a social network. User Sally may add an Acme Brand Watch to a wish list and user Jane may also add an Acme Brand Watch to a wish list. One or more cards may be generated. For example, when two cards are generated, each card may include an identification of the item (e.g., Acme Brand Watch), user associated with the item, action performed (e.g., added item to a wish list), and other relevant information. When one card is generated, the card may include an identification of the item (e.g., Acme Brand Watch), an aggregated list of users associated with the item, one or more actions performed (e.g., two connections added the same item to a wish list), and other relevant information.

In some examples, one or more cards may be generated based at least in part on one or more conditions. For example, if a connection performs any action related to an item (e.g., purchasing an item, adding an item to a wish list, providing a review of an item, etc.), a card may be generated. The conditions may limit the number of cards that are generated (e.g., at least two connections may perform an action, at least two actions may be performed to generate the card, etc.).

One or more cards may be generated based at least in part on an association between a connection identifier, user, and item. For example, two users may be connected in a social network and identified by a connection identifier at a first computer (e.g., one or more data feed management computers 210). One of the users may be associated with an item (e.g., purchase, review, etc.). The association between the user that performs the action with the item can associate the second user with the same item, based at least in part on the connection identifier between the two users. In some examples, one or more cards may be generated when a connection identifier exists between user A and user B, and one of the users performs an action with an item.

Figure 9:
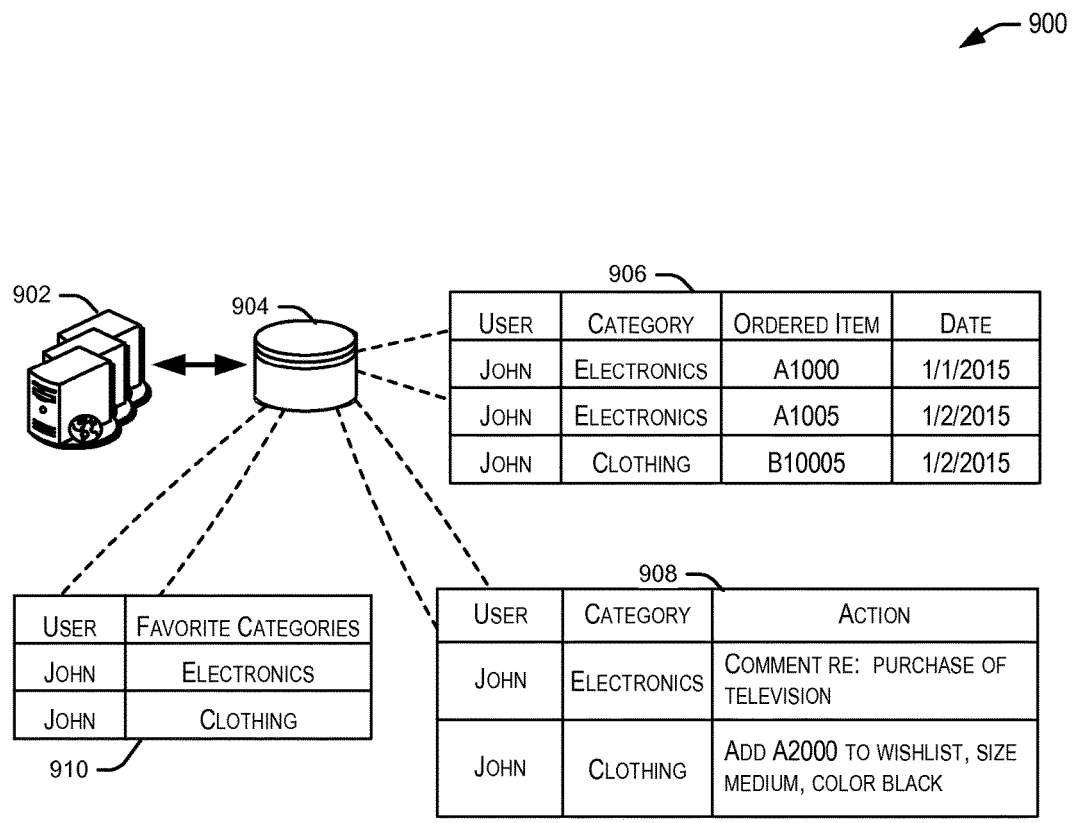
FIG. 9 illustrates examples of interaction and order history data described herein, according to at least one example.

FIG. 9 illustrates examples of interaction and order history data described herein, according to at least one example. In illustration 900, a computing device 902 interacts with a data store 904. Examples of the computing device 902 and data store 904 are illustrated in FIG. 2 as the data feed management computers 210 and data store 234, respectively.

The data store 904 may include order history 906 (e.g., one or more items ordered by the user from one or more merchants and/or electronic marketplace, etc.). As illustrated, user John ordered item A1000 on Jan. 1, 2015. Item A1000 is associated with category electronics. User John may also order items A1005 and item B10005 on Jan. 2, 2015, associated with categories electronics and clothing, respectively.

The data store 904 may include one or more actions 908. As illustrated, user John performs an action with an item in the electronics category (e.g., provides a comment regarding the purchase of the television, etc.). User John may also add an item in the clothing category to a wish list as an action (e.g., add item A2000 to wish list, size medium, color black, etc.). The actions may be included with the interaction data (e.g., received by computing device 902 and/or used to generate the one or more cards, etc.).

The data store 904 may include categories 910. For example, the computing device 902 may analyze the interaction data or order history data to identify one or more categories. The categories stored in the data store 904 may be identified based at least in part on a threshold (e.g., at least two actions for the user, or the most actions in a particular category when compared with all categories for the user, etc.).

Figure 10:
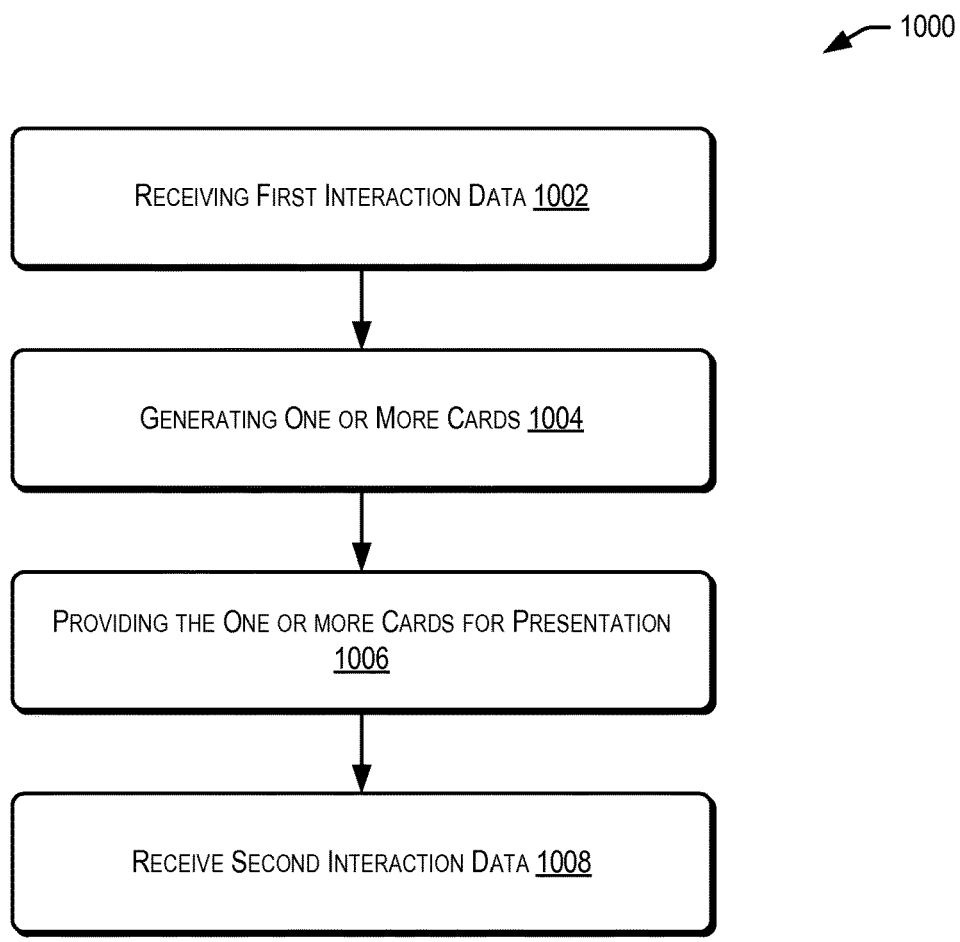
FIG. 10 illustrates an example flow determining a dynamic data feed described herein, according to at least one example.

FIG. 10 illustrates an example flow determining a dynamic data feed described herein, according to at least one example. In some examples, the one or more data feed management computers 210 (e.g., utilizing at least one of the interaction module 236, item module 238, social network module 240, sorting/aggregation module 242, and/or user interface module 244) or one or more user devices 204 shown in FIG. 2 may perform the process 1000 of FIG. 10.

Some or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1000 may begin at 1002 by receiving first interaction data. For example, the data feed management computers 210 may determine, receive, analyze, reference, or otherwise access the interaction data. The interactions may correspond to interactions between the one or more users. In some examples, the interactions may include a review associated with an item, a rating associated with the item, or a portion of a wish list that includes the item.

At 1004, one or more cards may be generated. For example, the data feed management computers 210 may generate the one or more cards based at least in part on the interaction data associated with one or more connection identifiers. The cards may include information about the users associated with the one or more connection identifiers and the item. In some examples, the cards may include graphical user interface components and/or correspond with purchasable items offered in part by the data feed management computers 210.

At 1006, the one or more cards may be provided for presentation. For example, the data feed management computers 210 may provide a graphical user interface via a network page for one or more user devices to access through a network. The graphical user interface can display graphical representations of the cards.

At 1008, second interaction data may be received. For example, the data feed management computers 210 may determine, receive, analyze, reference, or otherwise access the interaction data. In some examples, the second interaction data may be received after a request from a user device (e.g., refresh request at a network page, etc.), dynamically (e.g., when a user provides new interaction data and a card is generated, etc.), or after a threshold of time (e.g., every minute, hour, etc.).

In some examples, the second interaction data may be received after an activation of a card. For example, the card(s) may be presented on a feed and the user device may activate a card (e.g., by clicking, tapping, etc. the card). When the data feed management computers 210 receive an identification of the activation of the card, the data feed management computers 210 can initiate an action in response to the activation. For example, when the activation corresponds with a request to purchase the item, the request to purchase the item may be submitted through an electronic marketplace of items associated with the data feed management computers 210.

Illustrative methods and systems for determining a dynamic data feed are described above. Some or all of these systems and methods may, but need not, be implemented at least partially by architectures such as those shown at least in FIGS. 1-10 above.

Figure 11:
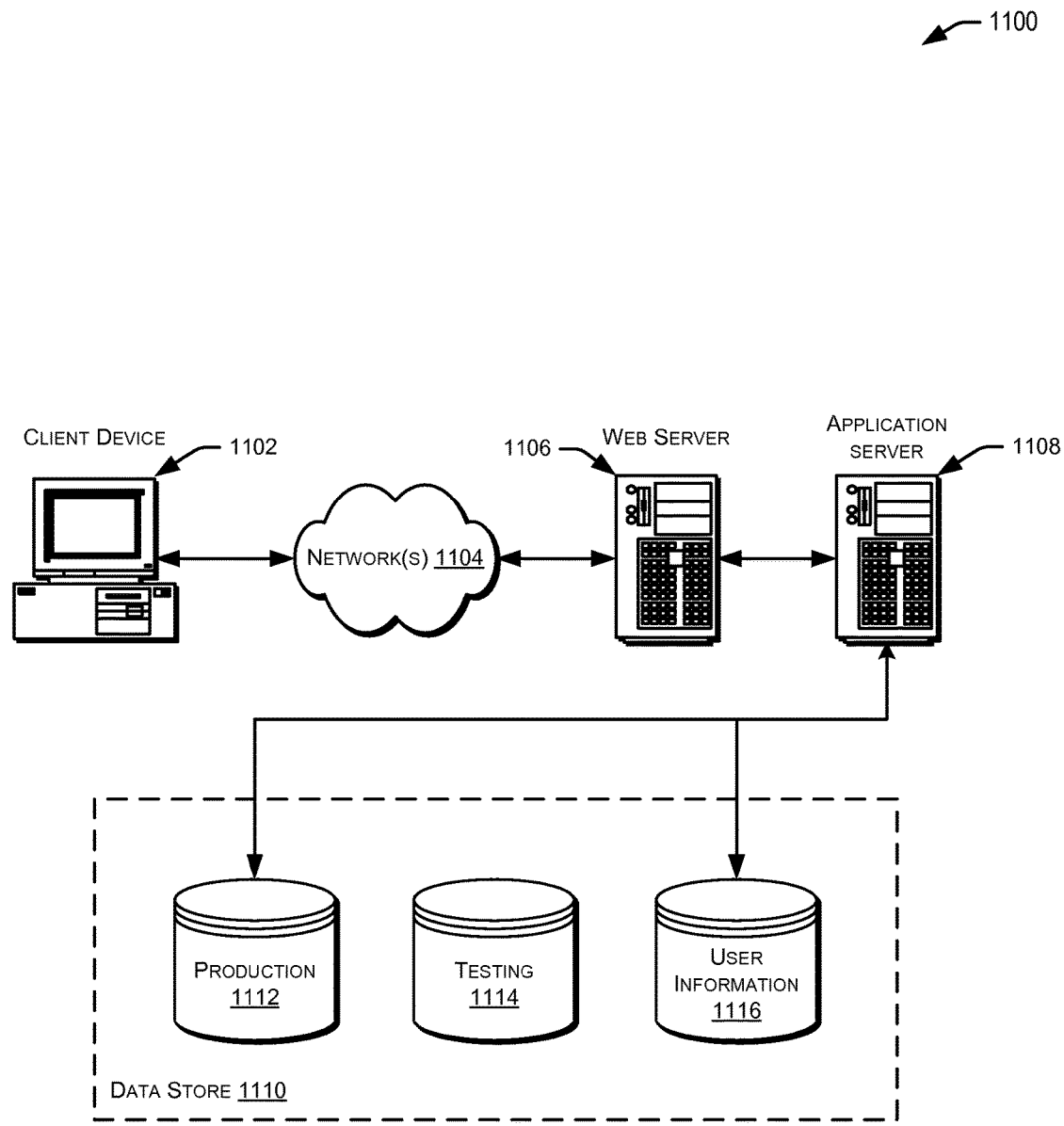
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media collectively storing computer-executable instructions that, when executed by one or more computer systems, configure the one or more computer systems to collectively perform operations comprising:
   receiving, at a first computer system, an identification of a social network provided by a second computer system, the social network including one or more other user accounts connected with a user account, individual user account connections being associated with a connection identifier;
   determining interaction data associated with the connection identifier, the interaction data including at least one of a review associated with an item, a rating associated with the item, or a portion of a wish list that includes the item, the item being offered by the first computer system for purchase, the interaction data corresponding to interactions between the one or more other user accounts associated with the connection identifier and the second computer system;
   determining, at the first computer system, an association between the connection identifier, the user account, and the item, the determination based at least in part on an analysis of the interaction data;
   determining an order history of the user account, the order history including at least one category of items that correspond with the item identified in the interaction data;
   generating, by the first computer system, a first graphical user interface object and a second graphical user interface object based at least in part on the determined association between the connection identifier, the user account, and the item, the first graphical user interface object at least including information about the one or more other user accounts associated with the connection identifier and the item;
   providing, by the first computer system for display at a user device, the first graphical user interface object and the second graphical user interface object;
   receiving updated interaction data from the second computer system;
   generating a third graphical user interface object for display by the first computer system using the updated interaction data from the second computer system;
   sorting the first graphical user interface object, the second graphical user interface object, and the third graphical user interface object based at least in part on the at least one category of items identified in the order history of the user account, wherein the third graphical user interface object is placed between the first graphical user interface object and the second graphical user interface object based at least in part on the order history; and
   providing, by the first computer system for display at the user device, the sorted first graphical user interface object, the second graphical user interface object, and the third graphical user interface object in a dynamic data feed.

2. The one or more non-transitory computer-readable storage media of claim 1, wherein the operations further comprise:
   identifying two related graphical user interface objects based at least in part on an association between the connection identifier and the item; and
   aggregating the two related graphical user interface objects.

3. The one or more non-transitory computer-readable storage media of claim 1, wherein the dynamic data feed is updated upon receiving second interaction data from the second computer system.

4. The one or more non-transitory computer-readable storage media of claim 3, wherein at least one graphical user interface object on the dynamic data feed includes a recommendation for the item.

5. A computer-implemented method, comprising:
   receiving, at a first computer system, an identification of a social network provided by a second computer system;
   determining, at the first computer system, interaction data associated with one or more connection identifiers, the one or more connection identifiers corresponding to connections between one or more other user accounts linked in the social network provided by the second computer system with a user account, the interaction data including data with respect to actions between the one or more other user accounts corresponding to the one or more connection identifiers and the social network provided by the second computer system, at least some of the interaction data including interactions with respect to an item being offered by the first computer system for purchase, and the interaction data corresponding to interactions between the one or more other user accounts and the second computer system;
   generating, by the first computer system, a first graphical user interface object and a second graphical user interface object based at least in part on the interaction data associated with the one or more connection identifiers, the first graphical user interface object at least including information about the one or more other user accounts associated with the one or more connection identifiers and the item;

providing, by the first computer system for display at a user device, the first graphical user interface object and the second graphical user interface object;

receiving updated interaction data from the second computer system;

generating a third graphical user interface object for display by the first computer system using the updated interaction data from the second computer system;

sorting the first graphical user interface object, the second graphical user interface object, and the third graphical user interface object based at least in part on an order history of the user account, wherein the third graphical user interface object is placed between the first graphical user interface object and the second graphical user interface object based at least in part on the order history; and providing, by the first computer system for display at the user device, the sorted first graphical user interface object, the second graphical user interface object, and the third graphical user interface object in a dynamic data feed.

6. The computer-implemented method of claim 5, wherein the first graphical user interface object, the second graphical user interface object, or the third graphical user interface object include a recommendation for the item.

7. The computer-implemented method of claim 5, further comprising:
accessing a connection graph, wherein the connection graph is generated based at least in part on the interaction data, and wherein the connection graph links the one or more other user accounts with the user account based at least in part on the interaction data.

8. The computer-implemented method of claim 7, wherein the connection graph identifies links between the one or more other user accounts and the item.

9. The computer-implemented method of claim 7, wherein the first graphical user interface object, the second graphical user interface object, or the third graphical user interface object are generated based at least in part on the connection graph.

10. The computer-implemented method of claim 5, wherein the interaction data includes a review associated with an item, a rating associated with the item, or a portion of a wish list that includes the item.

11. The computer-implemented method of claim 5, further comprising:
requesting updated interaction data after the sorted first graphical user interface object, the second graphical user interface object, and the third graphical user interface object are provided for presentation.

12. A first computer system, comprising:
a memory configured to store computer-executable instructions; and
at least one processor in communication with the memory configured to execute the computer-executable instructions to cause the first computer system to at least:
receive, at the first computer system, an identification of a social network provided by a second computer system;
determine, at the first computer system, first interaction data associated with one or more connection identifiers corresponding to one or more other user accounts linked in the social network provided by the second computer system with a user account, the first interaction data including actions associated with the one or more connection identifiers and the social network provided by the second computer system, at least some of the first interaction data including interactions with respect to an item being offered by the first computer system for purchase, and the first interaction data corresponding to interactions between the one or more other user accounts and the second computer system;

generate a first graphical user interface object and a second graphical user interface object based at least in part on the first interaction data, the first graphical user interface object at least including information about the one or more other user accounts linked in the social network, the first graphical user interface object for display by the first computer system;

provide, by the first computer system for display at a user device, the first graphical user interface object and the second graphical user interface object;

receive updated interaction data from the second computer system;

generate a third graphical user interface object for display by the first computer system using the updated interaction data from the second computer system;

sort the first graphical user interface object, the second graphical user interface object, and the third graphical user interface object based at least in part on an order history of the user account, wherein the third graphical user interface object is placed between the first graphical user interface object and the second graphical user interface object based at least in part on the order history; and provide, by the first computer system for display at the user device, the sorted first graphical user interface object, the second graphical user interface object, and the third graphical user interface object in a dynamic data feed.

13. The first computer system of claim 12, wherein the first interaction data includes the order history of the user account.

14. The first computer system of claim 12, wherein the instructions further cause the first computer system to:
identify an interaction in the first interaction data; and
determine a weight of the interaction based at least in part on the user account's affinity with a category associated with the interaction and one or more other user account's affinity with the category associated with the interaction.

15. The first computer system of claim 14, wherein the first graphical user interface object and the second graphical user interface object are stored based at least in part on the weight and, wherein the first graphical user interface object and the second graphical user interface object are presented in a sorted affinity order.

16. The first computer system of claim 12, wherein the instructions further cause the first computer system to:
identify an expert user account based at least in part on an identifier associated with the one or more other user accounts, wherein the first interaction data includes actions of the expert user account from a second social network, and wherein the second social network is different than the social network.

17. The first computer system of claim 12, wherein the instructions further cause the first computer system to:

receive a request to purchase the item through the first computer system, wherein the request to purchase the item is submitted through an electronic marketplace of items.

18. The first computer system of claim 12, wherein the first computer system is associated with an electronic marketplace and a second social network, but not the social network.

19. The first computer system of claim 12, wherein the instructions further cause the first computer system to:
   receive, at the first computer system, permission to contact the social network.

20. The first computer system of claim 12, wherein the instructions further cause the first computer system to:
   receive, at the first computer system, an activation of a graphical user interface object; and
   initiate an action in response to the activation.

\* \* \* \* \*